United States Patent Office 3,374,217
Patented Mar. 19, 1968

3,374,217
ISOLATION OF RESIN ACID MIXTURES
RICH IN LEVOPIMARIC ACID
Hugh B. Summers, Jr., Lake City, Fla., Winston D. Lloyd, El Paso, Tex., and Glen W. Hedrick, Lake City, Fla., assignors to the United States of America as represented by the Secretary of Agriculture
No Drawing. Filed June 23, 1964, Ser. No. 377,424
7 Claims. (Cl. 260—109)

A non-exclusive, irrevocable, royalty-free license in the invention herein described, throughout the world for all purposes of the United States Government, with the power to grant sublicenses for such purposes, is hereby granted to the Government of the United States of America.

The present invention relates to an improved process for isolating mixtures of pure resin acids. More particularly it relates to an improved process for isolating mixtures of pure resin acids from pine oleoresins. Still more particularly it relates to an improved process for isolating mixtures of resin acids rich in levopimaric acid from pine oleoresins. These resin acids are useful in the preparation of adducts of maleic anhydride, fumaric acid, β-propiolactone, acrylonitrile, and many other commercial uses.

As used herein the expression "mixtures of resin acids" relates to the abietic-type acids present in pine oleoresins or pine gum. These acids are present to the extent of about 70%, and are chiefly levopimaric, palustric, neoabietic, and abietic, the levopimaric acid being present to the extent of about 18–25% by weight of the pine oleoresin.

The expression "abietic-type acids" results from the fact that, because of the diene structure, these acids under many conditions tend to isomerize to abietic acid. As a result, these acids may react as abietic acid in some instances, and like levopimaric acid in other instances. The problem of isomerization will be discussed more fully below. However, for many industrial purposes a mixture of these acids, when pure and free of extraneous material, will often be as useful as pure levopimaric acid.

The expression "pine oleoresins" as used herein, relates to the "pine gums" obtained from slash- and long leaf-varieties of pine trees. The composition of this pine gum is about 20% turpentine, 3% water, and 76–77% rosin, the latter comprising the resin acids and so-called "neutrals."

It is a prime object of our invention to develop an improved commercial process using a limited amount of amine for the recovery from pine gum of resin acids having a purity suitable for commercial use and which may be used in place of levopimaric acid.

It is another object of our invention to develop a process for the recovery of essentially pure levopimaric acid from pine gum. The structure of levopimaric acid is (I). The numbering system is according to W. Klyne, J. Chem. Soc. 3072 (1953).

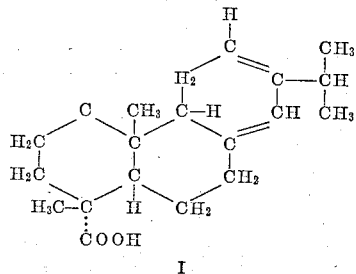

I

It is a still further object to use a recycling process for increasing the yield of the levopimaric acid. It is our still further object to develop a novel commercial process for the recovery of the expensive amine used in the separation of the resin acids from the rosin constituent of the pine gum.

It is our still further object to recover the turpentine, the amine, and the residual rosin from the pine gum. Residual rosin as used herein includes nonacidic components and some resin acids. These and other objects will be apparent in the discussion below.

Harris and Sanderson (J. Am. Chem. Soc., 70, 334 (1948)) were probably the first to precipitate resin-acid salts using 2-amino-2-methyl-1-propanol. They used "galipot" (a semicrystalline precipitate that separates from pine oleoresin). The galipot was dissolved in acetone and the amine was then added to precipitate the amine salts of the resin acids. The acid-amine salts were then dried and purified by crystallization from methyl acetate. In another method, Harris and Sanderson precipitated the resin acids from a solution of pine gum in gasoline by adding cyclohexylamine to the solution. The resin acids were then separated from the cyclohexylamine, dissolved in ethanol, treated with 2-amino-2-methyl-1-propanol, and dried.

Lawrence and coworkers (J. Am. Chem. Soc., 77, 6311 (1955)) precipicated the amine salts of the resin acids from pine oleoresin using 2-amino-2-methyl-1-propanol in 95% ethanol as the solvent. However, precipitation of the amine salts of the resin acids in ethanol is not complete and the recovery of the resin acid amine salt is poor.

Regardless of the above process employed, the dry, purified product is the amine salt of the resin acid. In order to obtain the free acid the salt is first ssupended in a water-immiscible solvent, such as ether, and then acidified with an aqueous acid solution such as hydrochloric acid, sulfuric acid, phosphoric acid, boric acid, acetic acid, and the like. When strong mineral acids are used, care must be exercised that the acidity of the solution is not greater than a pH of about 5, as acid solutions having a pH of this value cause the resin acids to isomerize. As a result of this isomerization the levopimaric, palustric, and neoabietic acids are changed to abietic acid. In other words, the levopimaric acid is lost. The mineral acid then combines with the amine to form a water-soluble salt and the free resin acid dissolves in the ether layer or other water-immiscible solvent. The water-immiscible solvent is then separated from the aqueous layer, and evaporated.

From the commercial viewpoint, this process has several serious disadvantages. In the first place, the water-immiscible solvent must not be heated above about 50° C. As noted above, when this happens the levopimaric acid is isomerized and converted to other abietic-type acids. In the second place, recovered turpentine-rosin mixtures from the acetone filtrates as exemplified below in Example 8 form stable emulsions even when diluted with turpentine or other water-immiscible solvent when treated with aqueous mineral acids. Consequently the amine cannot be recovered from such mixtures by an aqueous wash as described above.

Neither of the above cited references considered the recovery of the rosin or turpentine. Consequently there is a real need for a commerical process for isolating the abietic-type acids rich in levopimaric acid from pine oleoresin. Such a process should be simple and economical. It should produce levopimaric acid with a high degree of purity. It should produce satisfactory products using commercially-available equipment and commercially-available chemicals. Last, but not least, it should produce commercial-grade turpentine and recovered rosin.

We have now found that mixed resin acids rich in levopimaric acid may be isolated from oleoresins in a remarkably efficient and simple matter by a novel process which eliminates the problems of the prior art. Most important the process may be carried out in commercially-available equipment using commercially-available chemicals.

In general the process of our invention may be described as follows:

(1) The oleoresins are dissolved in acetone, (2) The solution is then filtered to remove trash and solids, (3) The filtered, acetone solution of oleoresin is then heated to a gentle reflux, (4) A solution of 2-amino - 2 - methyl - 1 - propanol in acetone is then added slowly to the refluxing solution, (5) The resin acid-amine salt is precipitated from the acetone solution and isolated by filtration. This filtrate contains some rosin, turpentine, some acetone-soluble resin-acid salts, and some amine, all of which are valuable.

(6) The isolated resin acid-amine salt (filter cake) is reslurried in acetone to remove residual turpentine and other nonacidic materials, filtered and dried, (7) The dried acid-salts are then purified by washing, or recrystallizing, from methanol, (8) The purified product of step 7 is then dissolved in methanol and the solution passed through a bed of an acidic ion-exchange resin which combines with the 2-amino - 2 - methyl - 1 - propanol thereby producing the free resin acids, (9) The mixed acids rich in levopimaric are then recovered by evaporation of the methanol, preferably under reduced pressure.

(10) The thus-purified material is then evaluated for purity by known analytical procedure.

As so described, the process of the present invention appears deceptively simple. However, each of the several steps is important. Each involves certain criteria which within certain ranges must be observed. Therefore, each will be more fully discussed in relation to the problem solved thereby, as well as its place in the overall treatment. By the process, the resin acids are recovered in essentially pure form. Most important, the concentration of pure levopimaric acid is high.

As noted above, an advantage of the present process is that it may be carried out using presently available plant equipment with commercially-available chemicals.

PREPARATION OF THE SOLUTION OF PINE GUM

Two types of pine gum may be used; that obtained from slash-pine (*Pinus ellioti*) and that obtained from long leaf pine (*Pinus palustris*). The gum is first analyzed for levopimaric acid and also for total resin acids and water to determine the required amount of acetone solvent to be used. Amounts ranging from about 5–10 liters of acetone per kilogram of resin acids (1.5–3.0 liters acetone per mole resin acids) may be used, although about 6.8 liters of acetone per kilogram resin acids (1.7–2.5 liters acetone per mole resin acids) is a good practice. The pine gum and acetone are maintained at ambient room temperature in a closed container equipped with a stirrer, and stirring is continued until the gum is in solution.

It is a critical feature that the pine oleoresin contains no more than three weight percent water. Amounts of water much above three weight percent cause a decrease in yield and result in slimy precipitates difficult to filter.

FILTRATION OF THE SOLUTION

Pine gums usually contain bits of wood, bark, shavings, dirt, etc. (sometimes called trash), which should be removed at this point or it may subsequently cause clogging of the equipment or be precipitated with the solids. This trash is removed by filtration. It is a critical feature of this operation that minimum contact with air should be maintained to avoid oxidation of the resin acids during this filtration.

PRECIPITATION OF RESIN-ACID AMINE SALTS

The filtered acetone solution of pine gum is then charged into a water-jacketed pot equipped with a stirrer, inlet tube, and reflux condenser. The solution is then heated to a gentle reflux (about 56° C.) and stirred slowly.

The 2 - amino - 2 - methyl - 1 - propanol is then dissolved in acetone, the weight of the acetone being equal to the weight of the amine. The purpose of the addition of the amine is to form the resin acid-amine salt which is only slightly soluble in the acetone.

The formation of these salts involves several critical factors. In the first place, the reaction between the amine and the resin is exothermic and the acetone solution of the amine should be added slowly. In the second place, the amine is expensive and difficult to recover. This adds to the overall expense of the operation and likewise increases the cost of the final product. In the third place, the acetone solution of amine should be added to the acetone solution of pine gum at a temperature of about 56° C. At this temperature the acetone solution of pine gum undergoes a gentle reflux and the resulting precipitate is more easily filtered.

The amount of amine may vary from a 1:1 molar ratio based on the resin acids present to a 1 to 2 or 1 to 3 moles amine to 1 mole acid. Excellent results are obtained when only a slight excess of amine to levopimaric acid is used, a ratio of 1:1.25 moles amine to one mole levopimaric acid being a good practice.

It is an advantage of our invention that such a limited amount of amine as a ratio of 1:1.25 moles amine to one mole levopimaric acid may be used. In the first place, the amine is expensive and decreasing the required quantity reduces the initial cost. In the second place, less amine must be recovered thereby reducing the time necessary in the recovery step. In the third place, in the recycling steps, which will be discussed more fully below, there is less material to recycle. In the fourth place, limited quantities of amine (but sufficient to react with all the resin acids present) provides for a more efficient process and reduces the number of steps required to secure a pure product.

ISOLATION OF THE RESIN ACID-AMINE SALT

The resin acid-amine salt is only slightly soluble in acetone and starts to precipitate almost immediately as colorless crystals. After the addition of all the amine, the mass is thick. The batch is then cooled to 5–10° C. after which the amine salt is isolated by conventional commercial means such as a filter press, vacuum drum, etc. The acetone (filtrate) contains some rosin, some acetone-soluble resin acid-amine salts, any excess of added free amine, and all the turpentine except the small amount retained by the isolated salt. This filtrate will be discussed more fully below.

Another critical feature of our process is the removal of all the turpentine from the isolated cake and it is proposed that the isolated cake be washed with acetone so that all of turpentine be with the acetone. The purification step requires treating the isolated cake with methanol. If turpentine is occluded in the cake, turpentine will eventually become mixed with methanol from which it cannot be separated by distillation because it forms an azeotrope—a binary consisting of turpentine and methanol or a ternary if water is present consisting of turpentine, water, and methanol. Acetone does not form such an azeotrope. The formation of such azeotropes is disadvantageous because the azeotrope would not be useful for purification purposes. The azeotrope would accumulate and not only tie up the quantities of turpentine which could not be sold, but also quantities of methanol which could not be re-used.

The residual turpentine is removed again agitating the filter cake in a fresh portion of acetone (1.7–2.5 liters acetone per mole resin acid) and again isolating the resin-acid-amine salts. The second filtrate is then used as starting acetone in the preparation of another solution of pine gum (Step 1). The turpentine-free cake is then dried.

PURIFYING THE RESIN-ACID-AMINE SALT

Purification may be achieved by either of two process, (a) washing with methanol which is discussed below as the "cold method," or (b) recrystallization from hot methanol which will be discussed below as the "hot method."

We prefer methanol as a solvent. It is economical, has a low boiling point (circa 65° C.) at reflux, and is a *specific* solvent for levopimaric acid-amine salt.

(a) *Purification by the "cold method."*—The dried filter cake after precipitation from acetone is washed, or slurried, in methanol. Although the levopimaric acid-amine salt has a rather high solubility in methanol the solubility of the other resin acid-amine salt is still higher. Thus a filter cake containing 33% levopimaric acid-amine salt and 67% other acid-amine salts will produce, after one reslurrying in methanol, a cake containing about 65% levopimaric acid-amine salt and 35% other acid-amine salts. A cake of this amount of levopimaric acid contains about 80% by weight of total acids of the abietic-type and, when free of amine and dried, forms a commercial product. The process, thus described, for the preparation of this commercial product is an embodiment of our invention.

For those commercial uses where a purer form of levopimaric acid is desirable, additional washings or slurryings in methanol are helpful. Thus, a second reslurry will produce amine salt containing about 80% levopimaric acid-amine salt and about 20% other resin acid-amine salts; a third reslurry will increase the levopimaric acid-amine salts to about 85% of the total dry filter cake and a fourth reslurry will increase the levopimaric acid-amine salt to about 95% of the dry filter cake. This improvement in purity of the levopimaric acid-amine salt due to slurrying and reslurrying (cold washing) was unexpected. Although we are not limiting ourselves as to the exact cause of this result one possibility is that methanol is a specific solvent for the levopimaric acid-amine salt. The use of methanol as a solvent for the purification of levopimaric acid-amine salt is also an embodiment of our invention.

It is an advantage of the reslurrying process in methanol of this invention that the recovered rosin has an improved color value of one to two grades.

(b) *Purification by recrystallization or "hot method."*—In this method the dry resin-acid-amine salts are dissolved in methanol at about 65° C. An increase in the temperature of the methanol from about 10–60° C. increases the solubility of 95% levopimaric acid-amine salt from about 6 to about 15 grams per 100 grams solvent. The hot solution is then cooled, and the purified, recrystallized, levopimaric acid-amine salt is recovered by crystallization.

It is an advantage of this invention that a recycling process may be used for either of the above two purification steps. The filtrate from the last purification as will be shown in the examples below may be added to the filter cake from the previous step.

Using methanol, the degree of purification with filter cakes (for example, cakes containing 33, 46, 65, or 87% by weight pure resin acid-amine salt) is not a linear function with respect to solid and methanol solvent. With each salt mixture, purification reaches a maximum and a further increase in the methanol solvent give no more increase in purification. This maximum is reached at a methanol to solids ratio of about 2:1, by weight. However, it is observed that when a filter cake containing about 85% levopimaric acid-amine salt is recycled (redissolved in methanol and recrystallized) the purity of the resultant cake is about 94–95%. In contrast to these results, something less than 94–95% purity will be obtained if the filter cake employed contains about 80% levopimaric acid-amine salt regardless of the amount of solvent used. Just why this occurs is not presently understood.

RECOVERY OF THE FREE ACID

The purified levopimaric acid is then separated from the amine by passing a methanol solution of the acid-amine salt through a bed of an acidic ion-exchange resin. The amount of the acid-amine salt in the methanol solution may range from about three to five weight percent, four weight percent being a good practice. The effluent is concentrated in vacuo and finally evaporated to dryness. When 95% pure amine salt is used, the recovered levopimaric acid is colorless; $[\alpha]_D$ —265.1 and the neutral equivalent is 303. The neutral equivalent calculated for $C_{20}H_{34}O_2$ is 302.4.

The ion-exchange resin should be a weakly-acidic type and may be used in a glass column or other material resistant to acids and amines, such as, stainless steel, glass, Monel metal, and the like. The depth of the bed should be thick enough so that all of the solution will come into contact with amine-free, ion-exchange resin.

The rate of passage of the solution will depend upon the size of the bed, the thickness of the layer of the ion-exchange resin and the concentration of acid-amine salt in the solution. The rate is readily controlled by checking the effluent periodically to be certain no resin acid-amine salts are present.

The amine is then recovered by backwashing the ion-exchange resin-amine with a dilute acid, such as, hydrochloric acid. An aqueous solution of 0.5 normal hydrochloric acid is used in the backwash and the overflow tested at intervals for amine. Backwashing is continued until the overflow is free of amine. The water in the ion-exchange resin bed is then replaced with acetone or alcohol, as required.

Analyses of the free acids are carried out by processes well known in the art.

RECOVERY OF RESIDUAL BYPRODUCTS

As noted above, it is an advantage that the amine, the rosin, and turpentine may be recovered from the actone-soluble resin acid-amine salts and acetone-soluble amine in the process of our invention. The acetone solution is passed through the ion-exchange resin and the amine is removed by this resin. This was unexpected and is an embodiment of our invention. Superior results are obtained when the water content of the acetone is adjusted to about four to six, preferably five, weight percent. The products are eluted from the bed with additional acetone until no turbidity results from dilution of a sample of the effluent with water.

The acetone is then recovered by distillation, after which the remaining liquid is sparged with steam to remove the turpentine, leaving the rosin. The turpentine so recovered is of commercial quality. The remaining rosin has a low acid number and also has a lower color grade.

It is also an advantage of our invention that the methanol-solubles consisting of residual acetone-soluble resin acid-amine salts, some soluble resins, and some free amine may also be recovered by passing the methanol solution over the bed of ion-exchange resins. The amine is recovered as the acid salt, as noted above; the methanol is separated by distillation and the rosin residue is incorporated with that obtained from the acetone fraction, as noted above. The recovery of the methanol-soluble resin-acid-amine salts by means of passing an organic solution of this type through an ion-exchange resin is believed to be new and also is an embodiment of our invention.

The following examples will further illustrate the embodiments of our invention and are given for illustrative purposes only. Temperatures are given in degrees centigrade. $[\alpha]_D^{25}$ is determined by standard equipment.

Example 1

In the following examples, pine gums included those obtained from slash and longleaf varieties. Crude slash or longleaf oleoresin (3400 grams) containing 2.27 kg.

of resin acids (7.54 moles) is dissolved in 13.44 liters of acetone and the trash and solids are removed by filtration. The filtrate is used as soon as possible and contact with air minimize to avoid oxidation. There is then added 2-amino-2-methanol-1-propanol (685 grams, 7.7 moles), a slight excess based on the acids present. This is dissolved in an equal volume by weight of acetone and added slowly to the filtrate which is heated to a gentle reflux (65° C.). Colorless resin acid-amine salts start to precipitate almost immediately and after addition of all of the amine, the mass is thick. The batch is cooled to 5–10° C. overnight and filtered to isolate the product. The filtrate is used for isolation of the turpentine and residual rosin as described below (Example 8).

The filter cake is then washed by dispersion in 13.44 liters of fresh acetone, cooled to 5–10° C., held overnight, and again isolated. To avoid contact with air and loss of solvent and to assist in filtering, rubber dams are used in all filtrations. The cake is then dried in a vacuum oven at 55° C., weighed, and analyzed for levopimaric acid content by the method of Lloyd and Hedrick. (J. Org. Chem. 26, 2029 (1961)). Total resin acids are determined by titration with standard alkali. The filtrate from the wash may be used for precipitation of the next batch. The results follow in Table I.

TABLE II

| Exp. No. | Amino Equiv.[b] | Type of Oleoresin | | | |
|---|---|---|---|---|---|
| | | Slash | | Longleaf | |
| | | Levopimaric Acid Salt, percent | | Levopimaric Acid Salt, percent | |
| | | Content | Recovery[a] | Content | Recovery[a] |
| 1 | 0.5 | 80.1 | 11.6 | 84.7 | 30.5 |
| 2 | 0.75 | 75.7 | 28.4 | 82.6 | 49.1 |
| 3 | 1.0 | 75.3 | 43.0 | 81.4 | 66.5 |
| 4 | 1.25 | 61.7 | 46.8 | 76.0 | 77.2 |
| 5 | 1.5 | 57.2 | 54.5 | 72.6 | 86.0 |
| 6 | 1.75 | 48.4 | 57.4 | 71.9 | 82.4 |
| 7 | 2.0 | 39.4 | 54.7 | 65.9 | 84.6 |
| 8 | 2.25 | 35.2 | 55.9 | | |

[a] Wash acetone not recycled. Accordingly, yields are on the low side.
[b] Per equivalent levopimaric acid.

It will be observed that increasing the amount of amine above an equivalent amount to levopimaric acid did not appreciably increase the yield, best results being obtained with about 1.75 to 2.0 equivalents amine per equivalent of acid.

*Example 3*

In the following examples the levopimaric acid salt is purified by crystallization from methanol. Specific

TABLE I

| Material | Type of Oleoresin | | | | | | | |
|---|---|---|---|---|---|---|---|---|
| | Slash[a] | | | | Longleaf[b] | | | |
| | Compn.,[c] percent | Kg. | Equiv. | Yield, percent | Compn.,[c] percent | Kg. | Equiv. | Yield, percent |
| WITH EXCESS AMINE | | | | | | | | |
| 1 ... Resin acid charge | | 2.27 | 7.54 | | | 2.28 | 7.55 | |
| 2 ... Levopimaric acid charge | | 0.622 | 2.06 | | | 0.884 | 2.92 | |
| 3 ... Amine charge | | 0.684 | 7.69 | | | 0.685 | 7.70 | |
| 4 ... Resin acid salt, calcd | | 2.93 | | | | 2.96 | | |
| 5 ... Resin acid salt recovery | 33.2 | 2.14 | | 73.0 | 46.8 | 2.29 | | 77.4 |
| 6 ... Levopimaric acid salt, calcd | | 0.805 | | | | 1.133 | | |
| 7 ... Levopimaric acid salt recovery | | 0.7105 | | 88.2 | | 1.0717 | | 94.5 |
| WITH LIMITED AMINE | | | | | | | | |
| 8 ... Amine charge[d] | | 0.220 | 2.47 | | | 0.4156 | 4.67 | |
| 9 ... Resin acid salt, calcd | | 0.966 | | | | 1.826 | | |
| 10 ... Resin acid salt recovery | 65.2 | [e]0.624 | | 64.6 | 65.9 | [f]1.510 | | 82.7 |
| 11 ... Levopimaric acid salt recovery | | 0.4085 | | 50.9 | | 0.995 | | 87.3 |

[a] 66.8% Resin acids; 18.3% levopimaric acid.
[b] 67.0% Resin acids; 25.7% levopimaric acid.
[c] Levopimaric acid salt content percent.
[d] Based on charge 2 above.
[e] Contains 21.4% of available resin acids.
[f] Contains 51.2% of available resin acids.

*Example 2*

In the following example, the effect of varying amounts of amine upon the precipitation of the resin acid-amine salt is given. The amount of amine used is based upon the amount of levopimaric acid which requires analyzing an aliquot of the filtered solution for levopimaric acid by the process as noted above.

The amine is dissolved in acetone and added to the filtrate at ambient room temperature with good agitation. For slash gum, the amount of amine is 220.0 grams (1.2 moles per mole of levopimaric acid); for longleaf gum the amount of amine charged on the same basis is 415.6 grams (1.6 moles). After addition of the amine the batch remains about 16 hours under ambient room temperature, and is then filtered. The filtrate is used for isolation of residual rosin and turpentine. The filter cake is then washed by first dispersing it in 6.72 liters of acetone and again isolated after standing overnight. The filtrate from the wash is again used for a subsequent batch. After as much of the acetone is removed as possible, the cake is dried in vacuo and analyzed for total resin-acid content and also for levopimaric acid. The results follow in Table I. The results of varying the amine over a wide range are given in Table II.

procedures are reported for purifying solids that contain 33, 47, 65.5, and 87.7% levopimaric acid salt. Four hundred grams of a resin acid-amine salt containing 33% levopimaric acid is added to 850 grams methanol and agitated for a few minutes to disperse the solids. After standing one hour, the product is isolated by filtration and dried for analysis. The salt recovered (110 grams) contains 72 grams (65.5%) of levopimaric acid-amine salt which is about 54.4% of the available levopimaric acid-amine salt in the original charge. The filtrate contains 290 grams of which 60.2 grams (20.7%) is levopimaric acid-amine salt. It is impossible to isolate any perceptible amount of levopimaric acid salt from acid-amine salt compositions containing as little as 20% of this salt. Consequently, the filtrate from this step is used for rosin recovery as described below.

*Example 4*

In this example, 400 grams of resin acid-amine salt containing 47% levopimaric acid-amine salt is added to 500 grams of methanol and treated as in the preceding example. The resin acid-amine salt which is recovered amounts to about 240 grams of which 156 grams is pure levopimaric acid. This gives a yield of 83%. The filtrate contains 160 grams of resin acid salt of which 32 grams (20%) is levopimaric acid-amine salt.

Example 5

A quantity of resin acid amine-salt (200 grams of 65.5% levopimaric acid-amine salt), in order to remove dirt, is charged to a butt-type extractor which consists of standard taper adapters for a coarse fritted-glass extraction shell. Methanol (500 grams) is refluxed so that the drip from the condenser percolates through the salt in the shell. When the salt is all dissolved, the solution, which contains crystals of salts at this point is cooled and the solids are isolated by filtration and dried. The material recovered (96 grams, 48% total salt recovery) contains 87.7% or 84.2 grams of pure levopimaric acid-amine salt, which is 64.3% of the available product. The filtrate contains 104 grams of resin acid-amine salts of which 46.8 grams or 45% is levopimaric acid-amine salt. This filtrate is recycled by reworking as in the preceding example or by evaporating to dryness and adding the solids to fresh gum for use in another example similar to Example 1.

Example 6

In this example, 200 grams of 87.7% levopimaric acid-amine salt is recrystallized from 800 grams methanol. After cooling to room temperature the product is isolated by filtering and drying in vacno. The isolated salt weighs 116.4 grams, is 95.4% pure, and shows a recovery of 66.4% of the available product. The filtrate contains 83.6 grams of salt of which 64.4 grams (77%) is the levopimaric acid-amine salt. This filtrate is then added to the procedure of Example 5 for recycling purposes.

Example 7

In the following example, the amine is removed from the solution of resin acid-amine salts by means of a weakly-acidic ion-exchange resin. The wet ion-exchange resin (575 grams wet, 213 grams dry) is packed into a 1.5″ (inside diameter) x 48″ glass column. When the resin acid-amine salt has been passed through and washed with methanol until the resulting filtrate is free of acid-amine salt, the ion-exchange resin is regenerated by backwashing (from the bottom up) with 0.5 normal aqueous hydrochloric acid until the overflow is free of amine. The ion-exchange resin is then washed with distilled water until free of chloride-ions. The water is then replaced with the organic solvent, either acetone or methanol as required.

The hydrochloric acid solution of amine is then concentrated, made basic, and steamed with dry steam until no volatile base appears in the distillate. This distillate is then fractionated to remove the water and the amine is recovered for re-use.

Example 8

As noted above in Example 1, the turpentine and rosin may be recovered from the acetone filtrate. This filtrate consists of an acetone solution of turpentine, the nonacidic portion of the resin, and the acetone-soluble resin acid-amine salts with possibly some free amine.

The acetone solution is then passed through the ion-exchange resin. Best results are obtained by adjusting the water content of the filtrate to about 5%. The products from the ion-exchange resin are then eluted and the resin is then flushed with acetone until no turbidity results from dilution of a sample of the effluent with water. The acetone and turpentine in the combined effluent and wash are removed from the residual rosin by continuous addition of the solution to a flask maintained at 135–150° C., and then evacuated. The residual rosin is sparged with live steam at 165° C. until the volatiles are removed.

Properties of the residual rosins resulting from a workup according to this example are listed in Table III.

Example 9

The turpentine is recovered from the acetone-water-turpentine mixture in the preceding example by distilling the acetone from the distillate, separating the turpentine from the water, and drying with rock salt.

The properties of the turpentine so recovered are within the specification for commercial turpentine.

TABLE III

| Rosin Source | Oleoresin | Acid No.[a] | Neutral Equiv. | Softening Point, °C.[b] | Color Grade Found | Loss[c] |
|---|---|---|---|---|---|---|
| Rosin from acetone filtrate, excess amine, Procedure I. | Slash | 127 | 441 | 62 | G | 5 |
|  | Longleaf | 122 | 460 | 59.5 | E | 5 |
| Rosin from acetone filtrate, limited amine, Procedure II. | Slash | 159 | 553 | 70 | G to M | 3 |
|  | Longleaf | 170.6 | 329 | 77 | I | 4 |
| Resin acid mixture from methanol, Purification Step A. | Slash | 178.7–179.2 | 307–314 | 84.5 | I | 6 |
|  | Longleaf | 184–185.3 | 302–305 | 85.5 | E | 3 |

[a] The range in acid number of commercial rosin is 158.4 to 172.0 as reported by McKelvey et al. in Paint, Oil and Chemical Review, 120, 11 (1957).
[b] The range in softening point of commercial rosin is 66° to 81° C. as reported by McKelvey et al. in Paint, Oil and Chemical Review, 120, 11 (1957).
[c] Degradation in color in grades compared with color grade of rosin obtained from pine oleoresins by usual processing.

We claim:

1. A process for treating pine gum containing (1) rosin comprising nonacidic components and abietic-type resin acids including levopimaric acid, (2) turpentine, (3) an amount of water not in excess of about three weight percent, and (4) acetone-insoluble solids, to recover said abietic-type resin acids rich in levopimaric acid and in essentially pure form, said process comprising:
 (a) treating the pine gum with acetone at ambient temperature to dissolve the resin acids;
 (b) filtering the acetone solution in the substantial absence of air to remove solids;
 (c) heating the filtered acetone solution to a gentle reflux of about 56° C.;
 (d) slowly adding an acetone solution containing at least one mole of 2-amino-2-methyl-1-propanol per mole of said resin acids to the gently refluxing solution of step (c) to thereby precipitate the resin acids as acid-amine salts, said acetone solution of 2-amino-2-methyl-1-propanol comprising equal quantities by weight of the amine and acetone solvent;
 (e) cooling the resulting mixture of step (d) to from about 5° to 10° C. and filtering said mixture to obtain (1) a filter cake consisting essentially of a small amount of turpentine, and the bulk of the precipitated resin acids-amine salts, and (2) a filtrate comprising an acetone solution of the nonacidic components of the rosin, the acetone-soluble resin acids-amine salts, any excess of the added free amine, water, and all the turpentine except for the small residual amount retained by the filter cake;
 (f) reslurring the filter cake of step (e) in about from 1.7 to 2.5 liters of fresh acetone per mole of the resin acids to dissolve the residual turpentine;
 (g) filtering the slurry of step (f) to obtain (1) a filter cake consisting essentially of the resin acids-amine salts free from the turpentine, and (2) a filtrate comprising an acetone solution of the residual turpentine;
 (h) drying the filter cake of step (g);
 (i) purifying the resin acids-amine salts contained in the dried filter cake of step (h) by treating the filter cake with methanol at a temperature ranging from about 15° to 65° C. and recovering from the resulting mixture a product consisting essentially of the resin acids-amine salt containing about 33% of the levopimaric acid-amine salt;
(j) drying the purified product of step (i);
(k) enriching the dried purified product of step (j) in the levopimaric acid-amine salt by reslurrying the product in methanol not less than one time and not more than four times, the slurry in each instance being filtered after each slurrying and the final filter cake being dried after the last slurrying, thereby to obtain a filter cake of the resin acids-amine salts containing about from 65 to 95 weight percent of the levopimaric acid-amine salt;
(l) recovering the levopimaric acid from the purified and enriched filter cake of step (k) by redissolving the filter cake in methanol to produce a methanol solution wherein the weight percent of the resin acids-amine salt in the methanol ranges about from 3 to 5 weight percent, and then passing the methanol solution through a bed of a weakly-acidic ion exchange resin to decompose the acid-amine salts and obtain a methanol solution of the free resin acids rich in levopimaric acid, and an ion exchange resin-amine; and thereafter
(m) recovering the mixed resin acids, rich in levopimaric acid, from the methanol solution of these acids, by evaporating the methanol.

2. The process of claim 1 wherein the ratio of acetone solvent to resin acids in steps (a) is about from 1.5 to 3 liters of acetone per mole of resin acids.

3. The process of claim 1 wherein the molar ratio of the 2-amino-2-methyl-1-propanol to the levopimaric acid in step (d) is about from 1 to 1.25 moles of amine per mole of levopimaric acid.

4. The process of claim 1 wherein the dried purified product of step (j) is enriched in the levopimaric acid-amine salt by reslurrying the said product, according to step (k), in methanol for one time, filtering the slurry to obtain the enriched filter cake, and drying the filter cake which contain about 65% of the levopimaric acid-amine salt.

5. The process of claim 6 wherein the dried purified product of step (j) is enriched in the levopimaric acid-amine salt by reslurrying the said product, according to step (k), in methanol for from three to four times to obtain a filter cake containing about from 85% to 95% of the levopimaric acid-amine salt.

6. The process of claim 1 wherein the amine is recovered from the ion exchange resin-amine formed in step (l) by backwashing the ion exchange resin-amine with aqueous 0.5 N HCl until the overflow is free of amine, concentrating the HCl solution of the amine, making the concentrated solution alkaline with a volatile base, steaming the alkaline, concentrated solution with dry steam until no volatile base appears in the distillate, and recovering the amine from the distillate by fractionation to remove the water.

7. A process for the recovery of residual byproducts of pine gum which are free of resin acids, comprising:
(a) combining the filtrates of steps (e) and (g) of claim 1 to obtain an acetone solution containing the nonacidic components of the rosin, the acetone soluble resin acids-amine salts, water, all the turpentine, and any excess of the added free amine;
(b) adding sufficient water to adjust the water content of the combined acetone solutions of step (a) to about from 4 to 6 weight percent;
(c) contacting the acetone-water solution of step (b) with an ion exchange resin whereby any free amine and the amine of the acetone-soluble resin acids-amine salts react therewith to form an acetone-insoluble ion exchange resin-amine with a resulting freeing of the resin acids from said acetone-soluble resin acids-amine salts, these freed resin acids remaining dissolved in the acetone-water solution along with the turpentine and the nonacidic components of the resin;
(d) distilling the resulting amine-free acetone-water solution from step (c) to separate the acetone therefrom;
(e) sparging the remaining solution of step (d), now free of both acetone and amine, with steam at about 165° C. to remove the turpentine; and
(f) recovering the residual rosin which consists essentially of the nonacidic components and the freed resin acids as the residue.

References Cited

Baldwin et al.: Acid Isomerization of Levopimaric Acid, Journal of the American Chemical Society, vol. 78, pp. 2015–2017.

Loeblich et al.: Thermal Isomerization of Levopimaric Acid, Journal of the American Chemical Society, vol. 77, pp. 6311–6313.

Summers et al.: I & EC Product Research and Development, vol. 4, pp. 221–223 relied upon.

Hedrick et al.: Levopimaric Acid, pp. 1–4 relied upon, Class 260, Sub-class 97 or Group 130, Class 260, Subclass 514.5.

Harris et al.: Journal of the American Chemical Society, vol. 70, pp. 334–343 relied upon.

Chemische Berichte, vol. 91, published in 1958, pp. 401–404 relied upon.

Chemical Abstracts, vol. 52, No. 21, Nov. 10, 1958, p. 18342(a) relied upon.

DONALD E. CZAJA, *Primary Examiner.*

LEON J. BERCOVITZ, *Examiner.*

F. McKELVEY, *Assistant Examiner.*